United States Patent
Mizutani et al.

(10) Patent No.: US 10,144,844 B2
(45) Date of Patent: Dec. 4, 2018

(54) PAINT COMPOSITION WHICH HAS EXCELLENT STAINING RESISTANCE AND PAINT FILMS OBTAINED BY COATING SAME

(71) Applicant: Akzo Nobel Coatings International B.V., Arnhem (NL)

(72) Inventors: Hiroki Mizutani, Yokohama (JP); Yutaka Takano, Yokohama (JP); Katsuhiko Ohsawa, Kanagawa (JP)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 643 days.

(21) Appl. No.: 14/647,912

(22) PCT Filed: Oct. 11, 2013

(86) PCT No.: PCT/EP2013/071305
§ 371 (c)(1),
(2) Date: May 28, 2015

(87) PCT Pub. No.: WO2014/082786
PCT Pub. Date: Jun. 5, 2014

(65) Prior Publication Data
US 2015/0307737 A1    Oct. 29, 2015

(30) Foreign Application Priority Data

Nov. 30, 2012  (JP) .................................. 2012/262295

(51) Int. Cl.
    C09D 167/02    (2006.01)
    C08K 3/36      (2006.01)
(52) U.S. Cl.
    CPC ............. *C09D 167/02* (2013.01); *C08K 3/36* (2013.01); *C08K 2201/003* (2013.01); *C08K 2201/011* (2013.01)

(58) Field of Classification Search
    None
    See application file for complete search history.

(56) References Cited

FOREIGN PATENT DOCUMENTS

| JP | 2001181556 A | 7/2001 |
|---|---|---|
| JP | 2005-146217 | 6/2005 |
| JP | 3926461 | 6/2007 |
| JP | 2002-309170 | 10/2010 |
| WO | WO-2012/001468 | 1/2012 |

OTHER PUBLICATIONS

PCT International Search Report in PCT/EP2013/071305, dated Oct. 16, 2014, 4 pages.
PCT International Written Opinion in PCT/EP2013/071305, dated Oct. 16, 2014, 4 pages.
PCT International Preliminary Report on Patentability in PCT/EP2013/071305, dated Jun. 11, 2015, 6 pages.

*Primary Examiner* — Ling Siu Choi
*Assistant Examiner* — Thuy-Ai N Nguyen
(74) *Attorney, Agent, or Firm* — McDonnell Boehnen Hulbert & Berghoff LLP

(57) ABSTRACT

Described is a paint composition comprising: a hydroxyl group-containing resin (A); a crosslinking agent (B), which reacts with hydroxyl groups; a radical copolymer (C); and an organosilica sol (D); wherein the radical copolymer (C): (a) has a monomer composition, with respect to the total mass of radically polymerizable monomer, of from 70.0 to 99.8 mass % unsaturated carboxylic acid amide, from 0.2 to 10 mass % radically polymerizable organosiloxane and from 0 to 29.8 mass % other radically polymerizable monomer, (b) is of weight average molecular weight from 1,500 to 15,000, and (c) has a hydroxyl group value of from 10 to 50 mgKOH/g, wherein the organosilica sol (D) is of average particle diameter from 1 to 30 nm, and wherein the solid fraction mass ratio represented by {(C) component+(D) component}/{(A) component+(B) component} is from 3 to 30% and the solid fraction mass ratio represented by {(C) component/(D) component} is from 0.2 to 5.0.

6 Claims, No Drawings

PAINT COMPOSITION WHICH HAS EXCELLENT STAINING RESISTANCE AND PAINT FILMS OBTAINED BY COATING SAME

CROSS-REFERENCE TO RELATED APPLICATIONS

This is application is the National Stage Entry of PCT/EP2013/071305, filed Oct. 11, 2013, which claims priority to Japanese Application No. 12/262295, filed Nov. 30, 2012, the disclosures of which are incorporate herein by reference in their entireties.

TECHNICAL FIELD

The present invention concerns paint compositions which have excellent staining resistance which can be used ideally in various fields and especially as top-coat paints for the production of coated steel sheet.

BACKGROUND

The steel sheets which are used for outdoor building materials (for example shutters, rain doors, doors, roofing materials, siding materials and the like), external fittings (for example external air conditioning motors) and the like are such that the surface of the coated steel sheet is readily stained as a result of the effects of rain (acid rain), dust storms and the like and so excellent staining resistance is required. A paint composition with which paint films which not only have staining resistance in a short period of time after coating but with which the staining resistance is maintained over a long period of time is required to provide the coated steel sheets with staining resistance.

A paint composition which includes a silicon oxide sol of which the surface has been modified with a silane coupling agent which has a specified average particle diameter has been disclosed in Patent Document 1 as a paint composition which has such staining resistance. With a paint film obtained by coating this paint composition the staining resistance of the paint film is retained for a long period of time but the period of time after coating until staining resistance appears needs to be shortened.

Furthermore, a surface controlling agent which provides hydrophilicity which includes a copolymer of unsaturated group-containing carboxylic acid morpholineamide monomer and acrylic acid ester group-containing organosiloxane monomer and a paint composition in which this surface controlling agent is used have been disclosed in Patent Document 2. However, the paint films obtained on coating this paint composition do not retain their staining resistance for a long period of time.

Moreover, a paint composition which includes polydimethylsiloxane-based copolymer, which has a polydimethylsiloxane part and a vinyl polymer chain part, and organosilica sol and the like has been disclosed in Patent Document 3. However, the paint films obtained by coating this paint composition are such that the paint film performance required for coated steel sheet, such as water resistance, bending workability and the like are unsatisfactory.

SUMMARY

Provided is a paint composition with which paint films of which paint film performance required of coated steel sheets such as water resistance, bending workability and the like are satisfactory and which not only provide staining resistance in a short period of time after being coated but with which the excellent staining resistance is maintained over a long period of time can be obtained.

DETAILED DESCRIPTION

As a result of thorough research carried out with a view to resolving the aforementioned problems, the inventors have discovered that the abovementioned problems can be resolved by means of a paint composition which contains in specified proportions radical polymer obtained using specified radically polymerizable monomer and organosilica sol which has a specified average particle diameter, and the present invention is based upon this discovery.

One or more embodiments provide a paint composition which includes a hydroxyl group-containing resin (A), a crosslinking agent (B) which reacts with hydroxyl groups, a radical copolymer (C) and an organosilica sol (D) in which the aforementioned radical copolymer (C):

(a) has a monomer composition, with respect to the total mass of radically polymerizable monomer, of from 70.0 to 99.8 mass % unsaturated carboxylic acid amide, from 0.2 to 10 mass % radically polymerizable organosiloxane and from 0 to 29.8 mass % other radically polymerizable monomer,
(b) is of weight average molecular weight from 1,500 to 15,000, and
(c) has a hydroxyl group value of from 10 to 50 mgKOH/g, the aforementioned organosilica sol (D) is of average particle diameter from 1 to 30 nm, the solid fraction mass ratio represented by {the aforementioned (C) component+the aforementioned (D) component}/{the aforementioned (A) component+the aforementioned (B) component} is from 3 to 30% and the solid fraction mass ratio represented by {the aforementioned (C) component/the aforementioned (D) component} is from 0.2 to 5.0.

In one or more embodiments, provides is a paint composition in which, in the abovementioned paint composition, the weight average molecular weight of the (A) component is from 2,000 to 60,000 and the hydroxyl group value is from 10 to 200 mgKOH/g.

In one or more embodiments, provided is a paint composition in which the (A) component in the abovementioned paint composition is a hydroxyl group-containing polyester resin.

In one or more embodiments, provided is a paint composition in which the (B) component in the abovementioned paint composition is of at least one type selected from among the melamine resins and the blocked polyisocyanate compounds.

In one or more embodiments, provided is a paint composition in which, in the abovementioned paint composition, the solid fraction mass ratio represented by {the aforementioned (A) component/the aforementioned (B) component} is from 1 to 9.

In one or more embodiments, provided is the paint films obtained by coating the abovementioned paint compositions.

With a paint composition according to one or more embodiments, it is possible to obtain paint films which satisfy the paint film performance required of coated steel sheets such as water resistance, bending workability and the like which not only provide staining resistance in a short time after coating but with which excellent staining resistance is also maintained over a long period of time.

In one or more embodiments, a paint composition includes a hydroxyl group-containing resin (A) as a base resin. Polyester resins, epoxy resins, acrylic resins and the like can be cited as examples of the hydroxyl group-containing resin (A). In one or more specific embodiments, polyester resins are used as the hydroxyl group-containing resin (A) due to their bending workability.

The polyester resins can be obtained with a known method using an esterification reaction with polybasic acids and polyhydric alcohols as the raw materials.

The usual polycarboxylic acids can be used for the polybasic acids, and a monobasic fatty acid or the like can also be used conjointly, as required. Examples of the polybasic acids include phthalic acid, isophthalic acid, tetrahydrophthalic acid, tetrahydroisophthalic acid, hexahydrophthalic acid, hexahydroterephthalic acid, trimellitic acid, adipic acid, sebacic acid, succinic acid, azeleic acid, fumaric acid, maleic acid, itaconic acid, pyromellitic acid and the anhydrides of these acids. Examples of the monobasic acids include ricinolic acid, oleic acid, linoleic acid, palmitic acid, stearic acid and the like. These polybasic acids and monobasic fatty acids can be used individually, and combinations of two or more types can also be used.

Glycols and polyhydric alcohols with three or more hydroxyl groups can be cited as polyhydric alcohols. Examples of the glycols include ethylene glycol, propylene glycol, diethylene glycol, triethylene glycol, tetraethylene glycol, dipropylene glycol, polyethylene glycol, polypropylene glycol, neopentyl glycol, hexylene glycol, 1,3-butanediol, 1,4-butanediol, 1,5-pentanediol, 1,6-hexanediol, 2-butyl-2-ethyl-1,3-propandiol, methylpropanediol, cyclohexane-dimethylol, 3,3-diethyl-1,5-pentanediol and the like. Furthermore, examples of the polyhydric alcohols which have three or more hydroxyl groups include glycerol, trimethylolethane, trimethylolpropane, pentaerythritol, dipentaerythritol and the like. These polyhydric alcohols can be used individually, and combinations of two or more types can also be used.

The weight average molecular weight of the hydroxyl group-containing resin (A) is, in one or more embodiments, from the viewpoints of bending workability and paint film appearance, from 20,000 to 60,000, more desirably from 4,000 to 50,000 and most specifically from 6,000 to 40,000. The weight average molecular weight in this invention is the value when the weight average molecular weight measured by means of gel permeation chromatography (GPC) is calculated on the basis of the weight average molecular weight of polystyrene.

The hydroxyl group value of the hydroxyl group-containing resin (A) is, in one or more embodiments, from 10 to 200 mgKOH/g, more specifically from 40 to 180 mgKOH/g and most specifically from 80 to 150 mgKOH/g for achieving staining resistance in a short period of time after coating.

No particular limitation is imposed upon the acid value of the hydroxyl group-containing resin (A) but, for example, in one or more embodiments, it is from 2 to 20 mgKOH/g.

In one or more embodiments, a paint composition includes a crosslinking agent (B) which reacts with hydroxyl groups.

Examples of the crosslinking agent (B) which reacts with hydroxyl groups include amino resins, polyisocyanate compounds, blocked polyisocyanate compounds and the like. From the viewpoints of bending workability and general utility, in one or more embodiments, the melamine resins and blocked polyisocyanate compounds are used.

Amino resin is a general term for resins where formaldehyde has been added to compounds which have amino groups and condensed, and in more practical terms these include melamine resins, urea resins, guanamine resins and the like. In one or more specific embodiments, melamine resins are used. The partially or fully methylolated melamine resins obtained by reacting melamine and formaldehyde, the partially or fully alkyl ether type melamine resins obtained by partially or fully etherifying the methylol groups of a methylolated melamine resin with an alcohol, the imino group-containing melamine resins and melamine resins which are mixtures of these types can be cited as melamine resins. Examples of the alkyl ether type melamine resins include methylated melamine resins, butylated melamine resins, methyl/butyl mixed alkyl type melamine resins and the like.

Examples of the polyisocyanate compounds include aliphatic diisocyanates such as hexamethylene diisocyanate, trimethylhexamethylene diisocyanate, dimer acid diisocyanate, and the like, and cyclic aliphatic diisocyanates such as isophorone diisocyanate, xylylene diisocyanate (XDI) m-xylylene diisocyanate, hydrogenated XDI and the like, and also aromatic diisocyanates such as tolylene diisocyanate (TDI), 4,4-diphenylmethane diisocyanate (MDI), hydrogenated TDI, hydrogenated MDI and the like, and adducts, biuret forms, and isocyanurate forms of these. These polyisocyanate compounds can be used individually and combinations of two or more types can also be used.

The compounds where the isocyanate groups of polyisocyanate compounds have been blocked with, for example, alcohols such as butanol and the like, oximes such as methyl ethyl ketone oxime and the like, lactams such as ε-caprolactam and the like, diketones such as acetoacetic acid diesters and the like, imidazoles such as imidazole, 2-ethylimidazole and the like or phenols such as m-cresol and the like can be cited as blocked polyisocyanate compounds.

In a paint composition according to one or more embodiments, the solid fraction mass ratio represented by {aforementioned (A) component/aforementioned (B) component} is, from the viewpoints of the paint film hardness and bending workability, from 1 to 9, more specifically from 1.5 to 5.5 and most specifically from 1.75 to 5.5. This solid fraction mass ratio is, for example, 1, 1.5, 1.75, 2, 2.25, 2.5, 2.75, 3, 3.5, 4, 4.5, 5, 5.5, 6, 7, 8 or 9, and it may be within the range between any two of the numerical values shown.

A paint composition of this invention includes a radical copolymer (C).

The radical copolymer (C) can be obtained with a known method using a radical polymerization reaction with radically polymerizable monomers as the raw material component.

The radical copolymer (C) has a monomer composition, with respect to the whole of the radically polymerizable monomer, of from 70.0 to 99.8 mass % unsaturated carboxylic acid amide, from 0.2 to 10 mass % radically polymerizable organosiloxane and from 0 to 29.8 mass % other radically polymerizable monomer. Hence, unsaturated carboxylic acid amide and radically polymerizable organosiloxane are essential components and the other radically polymerizable monomers are optional components.

Examples of the unsaturated carboxylic acid amides include dimethyl(meth)acrylamide, dimethylamino-propyl (meth)acrylamide, diethyl(meth)acrylamide, (meth)acryloylmorpholine and the like. In one or more specific embodiments, (meth)acryloylmorpholine and dimethylacrylamide are used since staining resistance is achieved in a short period of time after coating. These unsaturated carboxylic acid amides can be used individually and combinations of two or more types can also be used.

Examples of the radically polymerizable organosiloxanes include polysiloxane mono(meth)acrylate, polysiloxane di(meth)acrylate and the like. Commercial polysiloxane mono(meth)acrylate products include, for example, Silaprene FM-0711, FM-0721, FM-0725 (trade names, produced by the JNC Co.) and X22-174ASX, X-22-174DX (trade names, produced by the Shinetsu Kagaku Kogyo Co.). Furthermore, commercial polysiloxane di(meth)acrylate products include Silaprene FM-0711, FM-7721, FM-7725 (trade names, produced by the JNC Co.) and X-22-164A, X-22-164B, X-22-164C (trade names, produced by the Shinetsu Kagaku Kogyo Co.).

In one or more embodiments, the proportion by mass of unsaturated carboxylic acid amide with respect to the whole of the radically polymerizable monomer which forms the raw material of the radical copolymer (C) is from 70.0 to 99.8 mass %. In one or more specific embodiments, the proportion by mass is at least 80.0 mass %, and more specifically at least 85.0 mass %. If the proportion by mass is less than 70 mass % then there are cases where staining resistance is not achieved in a short period of time after coating. The proportion by mass may be, for example, 70, 75, 80, 85, 90, 95, 99 or 99.8 mass %, and it may be within the range between any two of the numerical values shown.

In one or more embodiments, the proportion by mass of radically polymerizable organosiloxane with respect to the whole of the radically polymerizable monomer which forms the raw material of the radical copolymer (C) is from 0.2 to 10.0 mass %, specifically from 0.5 to 5.0 mass %, and more specifically from 1.0 to 2.5 mass %. In those cases where the proportion by mass of the radically polymerizable organosiloxane is less than 0.1 mass % and in those cases where it exceeds 2.5 mass % there are cases where staining resistance is not achieved in a short period of time after coating. The proportion by mass is, for example, 0.2, 0.5, 1, 1.5, 2, 2.5, 3, 3.5, 4, 4.5, 5, 6, 7, 8, 9 or 10 mass %, and it may be within the range between any two of the numerical values shown.

Other radically polymerizable monomers can be used as raw materials of the radical copolymer (C). Examples of other radically polymerizable monomers include (meth) acrylic acid, methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth) acrylate, hexyl (meth)acrylate, 2-ethylhexyl (meth)acrylate, octyl (meth)acrylate, lauryl (meth)acrylate, stearyl (meth) acrylate, allyl alcohol, 2-hydroxyethyl (meth)acrylate, 3-hydroxypropyl (meth)acrylate, 4-hydroxybutyl (meth)acrylate, styrene, cyclohexyl (meth)acrylate, 4-tert-butylcyclohexyl (meth)acrylate, (meth)acrylonitrile and the like. These radically polymerizable monomers can be used individually and combinations of two or more types can also be used.

In one or more embodiments, the weight average molecular weight of the radical copolymer (C) is from 1,500 to 15,000, specifically from 2,000 to 12,000 and more specifically from 3,000 to 10,000. In those cases where the weight average molecular weight is less than 1,500 and in those cases where it exceeds 15,000 there are cases where staining resistance is not achieved in a short period of time after coating. The weight average molecular weight is, for example, 1,500, 2,000, 3,000, 4,000, 5,000, 6,000, 7,000, 8,000, 9,000, 10,000, 12,000 or 15,000, and it may be within the range between any two of the numerical values shown.

In one or more embodiments, the hydroxyl group value of the radical copolymer (C) is from 10 to 50 mgKOH/g, specifically from 15 to 40 mgKOH/g and more specifically from 15 to 35 mgKOH/g. In those cases where the hydroxyl group value is less than 10 mgKOH/g and in those cases where it exceeds 50 mgKOH/g there are cases where staining resistance is not achieved in a short period of time after coating.

A paint composition of this invention includes an organosilica sol (D) which has a specified average particle diameter.

Organosilica sol signifies a silica sol dispersed in an organic solvent. The organic solvent should be a solvent in which it is possible to disperse a silica sol, and examples include methanol, isopropanol, ethylene glycol, ethyl acetate, butyl acetate, n-propyl cellosolve, dimethylacetamide, methyl ethyl ketone, methyl isobutyl ketone, toluene, xylene.n-butanol mixed solvent, propylene glycol monomethyl acetate, propylene glycol monomethyl ether, propylene glycol monomethyl ether acetate and the like.

Commercial organosilica sol products include methanol silica sol, MA-ST-M, IPA-ST, IPA-ST-L, IPA-ST-ZL, IPA-ST-UP, EG-ST, EG-ST-ZL, DMAC-ST, DMAC-ST-ZL, NPC-ST-30, PGM-ST, MEK-ST, MEK-ST-L, MEK-ST-ZL, MEK-ST-UP, MIBK-ST, MIBK-SD, PMA-ST, EAC-ST, NBAC-ST, XBA-ST, TOL-ST, MEK-AC-2101, MEK-AC-4101 (trade names, produced by the Nissan Kagaku Kogyo Co.), OSCAL-1432, OSCAL-1132, OSCAL-1632, OSCAL-1421 (trade names, produced by the Nikki Shokubai Kagaku Co.).

In one or more embodiments, the average particle diameter of the organosilica sol (D) which is used in a paint composition of this invention is from 1 to 30 nm, specifically from 5 to 25 nm, and more specifically from 5 to 20 nm. If the average particle diameter exceeds 30 nm there are cases where the bending workability declines. Moreover, the average particle diameter in this specification is the value obtained with the BET method.

The organosilica sol (D) which is used in the invention may be one which has been subjected to surface treatment with a silane coupling agent. Examples of the silane coupling agents include vinyltrimethoxysilane, γ-methacryloyloxypropyltrimethoxysilane, γ-glycidoxypropyltrimethoxysilane, γ-aminopropyltrimethoxysilane, methyltrimethoxysilane, dimethyldimethoxysilane and the like. These silane coupling agents can be used individually and combinations of two or more types can also be used.

In one or more embodiments, the solid fraction mass ratio of the paint composition represented by {aforementioned (C) component/aforementioned (D) component} is from 0.2 to 5.0, specifically from 0.5 to 3.5, and more specifically from 1.5 to 2.5. If the solid fraction mass ratio is less than 0.2 there are cases where staining resistance is not achieved in a short period of time after coating, and if it exceeds 5.0 then there are cases where the staining resistance of the paint film is not retained for a long period of time.

In a paint composition of this invention the solid fraction mass ratio represented by {aforementioned (C) component+ aforementioned (D) component}/{aforementioned (A) component+aforementioned (B) component} is from 3 to 30%, specifically from 7.5 to 20%, and more specifically from 7.5 to 17% and most specifically from 7.5 to 12%. If the sum of the solid fraction masses of the radical copolymer (C) and the organosilica sol (D) is less than 1% there are cases where adequate staining resistance cannot be imparted to a coated steel sheet, and if it exceeds 30% there are cases where the water resistance is reduced.

In addition to the abovementioned components, the various known components which are generally used in the paint field can be included, as required, in a paint composition of this invention. In more practical terms examples include various surface controlling agents such as leveling agents, anti-foaming agents and the like, various additives such as dispersing agents, settling inhibitors, ultraviolet absorbers, light stabilizers, scratch inhibitors and the like, various pigments such as coloring pigments, true pigments and the like, glitter materials, curing catalysts, organic solvents and the like.

In one or more embodiments, a paint composition of this invention may be an organic solvent type paint or an aqueous paint, and, in one or more specific embodiments, it is an organic solvent type paint. The organic solvents include one type, or a mixture of two or more types, of, for example, the ester-based solvents such as n-butyl acetate, isobutyl acetate, n-pentyl acetate, 3-methoxybutyl acetate and the like, the ketone-based solvents such as methyl isobutyl ketone, cyclohexanone, isophorone and the like, the aromatic solvents such as Solvesso 100, Solvesso 150 (trade names, produced by the Exxon Mobil Chemical Co.) and the like, and the alcohol-based solvents such as butanol, butyl cellosolve and the like.

In the production of a coated steel sheet generally an undercoat paint film is formed on the object which is to be painted and a top-coat paint is coated over the undercoat paint film. The formation of the undercoat paint film can impart various aspects of performance such as corrosion resistance and the like to the coated steel sheet. The use of the paint compositions of this invention is not subject to any particular limitation but they are used ideally as top-coat paints in the production of coated steel sheets.

Examples of the objects for painting which are coated with a paint composition of this invention are those where treatment with a chromium-free or chromate-based chemical forming agent or the like has been carried out on various types of zinc plated steel sheet such as molten-zinc plated steel sheet, electro-zinc plated steel sheet, alloying zinc plated steel sheet, aluminum-zinc plated steel sheet, nickel-zinc plated steel sheet, magnesium-aluminum-zinc plated steel sheet, magnesium-aluminum-silica-zinc plated steel sheet and the like, stainless steel sheet, aluminum sheet and the like. In one or more embodiments, for the chemical forming treatment, a chromium-free type chemical forming treatment agent issued.

In those cases where a paint composition of this invention is used as a top-coat paint in the production of coated steel sheet the undercoat paint may be, for example, a polyester-based paint, epoxy resin-based paint or the like, and it may include either a chromium based or a chromium-free anti-rust pigment.

The methods which are generally used for the production of coated steel sheet, for example roll-coater coating, curtain-flow coater coating and the like, can be used for the method of coating a paint composition of this invention. The general coating conditions for the production of coated steel sheet can be used as the coating conditions for a paint composition of this invention.

The paint film thickness of a top-coat paint in the production of coated steel sheet is, for example, from 10 to 25 μm, and the heating and curing conditions of the top-coat paint film are, for example, a highest sheet temperature attained of from 190 to 250° C. and a curing time of from 20 to 180 seconds.

Moreover, one or more mid-coat paint films may be formed between the undercoat paint film and the top-coat paint film in accordance with the performance required of the coated steel sheet.

EXAMPLES

The invention is described in more detail below by means of illustrative examples, but the invention is not limited by these illustrative examples. Moreover, in the absence of any indication to the contrary "parts", "%" and "ratio" in the examples signify "parts by mass", "mass %" and "mass ratio" respectively.

Example of Production 1-1 Production of Hydroxyl Group-Containing Polyester Resin A-1

Isophthalic acid (35.8 parts by mass), 21.4 parts by mass of adipic acid, 27.5 parts by mass of neopentyl glycol and 15.3 parts by mass of trimethylolpropane were introduced into a flask which had been furnished with a thermometer, a Dean and Stark tube, reflux condenser, nitrogen delivery tube and stirrer and, while stirring, the temperature was gradually raised to 240° C. and then 2.7 parts by mass of xylene were introduced and the acid value was measured periodically as a water-eliminating condensation reaction was being carried out. Once the acid value had fallen to 15 mgKOH/g or below 56 parts by mass of a mixed solvent (aromatic solvent (trade name Solvesso 100, produced by the Exxon Mobil Chemical Co.)/cyclohexanone=50/50 (mass ratio)) were added for dilution and the hydroxyl group-containing polyester resin A-1 which had the property values shown in Table 1 was obtained.

Example of Production 1-2 Production of Hydroxyl Group-Containing Polyester Resin A-2

The hydroxyl group-containing polyester resin A-2 which had the property values shown in Table 1 was obtained with the same method as in Example of Production 1-1 in accordance with the compounding composition shown in Table 1.

TABLE 1

| Hydroxyl Group-containing Resin (A) | A-1 | A-2 |
|---|---|---|
| Isophthalic Acid | 35.8 | 35.3 |
| Adipic Acid | 21.4 | 19.8 |
| Hydrogenated Castor Oil | | 3.6 |
| Neopentyl Glycol | 27.5 | 23.1 |
| Trimethylolpropane | 15.3 | 18.2 |
| TOTAL | 100.0 | 100.0 |
| Resin Solid Fraction | 60% | 60% |
| Acid Value (mgKOH/g) | 10 | 12.5 |
| Hydroxyl Group Value (mgKOH/g) | 105 | 101 |
| Weight Average Molecular Weight | 11000 | 35000 |

Example of Production 2-1 Production of Radical Copolymer C-1

Cyclohexanone (59.7 parts by mass), was introduced into a flask which had been furnished with a reflux condenser, a thermometer, stirring apparatus, a nitrogen gas delivery tube and a dropping funnel and the temperature was raised to 100° C. Next a mixture of 36.7 parts by mass of acryloyl-morpholine, 0.8 part of polysiloxane monomethacrylate (trade name Silaprene FM-0711, produced by the JNC Co., weight average molecular weight 1,000), 2.5 parts by mass of 2-hydroxyethyl acrylate and 0.20 part by mass of radical polymerization initiator (trade name Perbutyl O, produced by the NOF Co.) as a drip-feed component was drip fed over a period of 3 hours with the dropping funnel. After the drip feed had been completed the stirring was continued for 1 hour and then 0.10 part by mass of supplementary catalyst was added dropwise. The reaction was continued for 2 hours after this and then the reaction was terminated and the radical copolymer C-1 which had the property values shown in Table 2 was obtained.

Examples of Production 2-2 to 2-12 Production of Radical Copolymers C-2 to C-12

The radical copolymers C-2 to C-12 which had the property values shown in Table 2 were obtained with the same method as in Example of Production 2-1 in accordance with the compounding composition shown in Table 2.

TABLE 2

| Radical Copolymer (C) | | C-1 | C-2 | C-3 | C-4 | C-5 | C-6 |
|---|---|---|---|---|---|---|---|
| Reaction Solvent | Cyclohexanone | 59.7 | 59.7 | 59.7 | 59.8 | 56.1 | 59.7 |
| Drip-feed Component | Acryloylmorpholine | 36.7 | | 14.4 | 16.6 | 20.6 | 26.0 |
| | Dimethylacrylamide | | 36.7 | | 15.0 | 18.4 | |
| | Isopropylacrylamide | | | 14.4 | 4.0 | | |
| | FM0711 (Note 1) | 0.8 | 0.8 | 1.6 | 0.2 | 0.8 | 0.8 |
| | FM7711 (Note 2) | | | 1.6 | | | |
| | 2-Hydroxyethyl acrylate | 2.5 | 1.7 | 1.7 | | 1.0 | 2.5 |
| | 2-Hydroxyethyl methacrylate | | 0.8 | 6.4 | 4.2 | | 10.7 |
| | Butyl acrylate | | | | | | |
| | PO (Note 3) | 0.20 | 0.20 | 0.20 | 0.10 | 3.00 | 0.20 |
| Supplementary Catalyst | PO (Note 3) | 0.10 | 0.10 | 0.10 | 0.10 | 0.10 | 0.10 |
| TOTAL | | 100.0 | 100.0 | 100.0 | 100.0 | 100.0 | 100.0 |
| Monomer Composition (mass %) | Unsaturated Carboxylic Acid Amide | 91.8% | 91.8% | 71.8% | 89.2% | 95.6% | 65.0% |
| | Radically Polymerizable Organosiloxane | 2.0% | 2.0% | 8.0% | 0.4% | 2.0% | 2.0% |
| | Other Monomer | 6.2% | 6.2% | 20.2% | 10.4% | 2.4% | 33.0% |
| Resin Solid Fraction | | 40% | 40% | 40% | 40% | 40% | 40% |
| Hydroxyl Group Value (mgKOH/g) | | 30 | 20 | 20 | 45 | 12 | 30 |
| Weight Average Molecular Weight | | 7000 | 7000 | 7000 | 13500 | 2300 | 7100 |

| Radical Copolymer (C) | | C-7 | C-8 | C-9 | C-10 | C-11 | C-12 |
|---|---|---|---|---|---|---|---|
| Reaction Solvent | Cyclohexanone | 59.7 | 59.7 | 59.7 | 59.7 | 59.9 | 59.9 |
| Drip-feed Component | Acryloylmorpholine | 36.7 | 33.1 | 39.2 | 34.6 | 36.7 | 36.7 |
| | Dimethylacrylamide | | | | | | |
| | Isopropylacrylamide | | | | | | |
| | FM0711 (Note 1) | | 4.4 | 0.4 | 0.8 | 0.8 | 0.8 |
| | FM7711 (Note 2) | | | | | | |
| | 2-Hydroxyethyl acrylate | 2.5 | 2.5 | 0.4 | 4.6 | 2.5 | 2.5 |
| | 2-Hydroxyethyl methacrylate | 0.8 | | | | | |
| | Butyl acrylate | | | | | | |
| | PO (Note 3) | 0.20 | 0.20 | 0.20 | 0.20 | 4.00 | 0.05 |
| Supplementary Catalyst | PO (Note 3) | 0.10 | 0.10 | 0.10 | 0.10 | 0.10 | 0.10 |
| TOTAL | | 100.0 | 100.0 | 100.0 | 100.0 | 100.0 | 100.0 |
| Monomer Composition (mass %) | Unsaturated Carboxylic Acid Amide | 91.8% | 82.8% | 98.0% | 86.6% | 91.8% | 91.8% |
| | Radically Polymerizable Organosiloxane | 0.0% | 11.0% | 1.0% | 2.0% | 2.0% | 2.0% |
| | Other Monomer | 8.2% | 6.2% | 1.0% | 11.4% | 6.2% | 6.2% |
| Resin Solid Fraction | | 40% | 40% | 40% | 40% | 40% | 40% |
| Hydroxyl Group Value (mgKOH/g) | | 30 | 30 | 5 | 55 | 30 | 30 |
| Weight Average Molecular Weight | | 7200 | 7200 | 7300 | 7200 | 1200 | 22000 |

Details of the various compounded components shown in Table 2 are indicated below.

(Note 1) FM0711: Polysiloxane monomethacrylate (trade name Silaprene FM-0711, produced by the JNC Co., weight average molecular weight 1,000)

(Note 2) FM7711: Polysiloxane dimethacrylate (trade name Silaprene FM-7711, produced by the JNC Co., weight average molecular weight 1,000)

(Note 3) PO: Radical polymerization initiator (trade name Perbutyl O, produced by the NOF Co.)

Example 1 Production of a Paint Composition

The hydroxyl group-containing polyester resin A-1 (39.9 parts by mass), 34.2 parts by mass of titanium dioxide (trade name TiPure R960, produced by the DuPont Co.) and 10.0 parts by mass of mixed solvent (aromatic solvent (trade name Solvesso 100, produced by the Exxon Mobil Chemical Co.)/cyclohexanone=50/50 (ratio by mass)) were mixed together and dispersed in a sand mill until the pigment particle size reached 10 μm and a mill-base was obtained. Next 17.4 parts by mass of melamine resin B-1 (trade name Melan 2040, produced by the Hitachi Kasei Kogyo Co., imino group-containing butylated melamine resin, resin solid fraction 59 mass %), 5.1 parts of the radical copolymer C-1 and 3.4 parts by mass of organosilica sol D-1 (trade name MIBK-SD, produced by the Nissan Kagaku Kogyo Co., average particle diameter 10 to 15 nm, solid fraction 30 mass %) were mixed with this mill-base and the paint composition of Example 1 was obtained.

Examples 2 to 13 and Comparative Examples 1 to 14 Production of Paint Compositions The paint compositions of Examples 2 to 13 and Comparative Examples 1 to 14 were produced with the same method as in Example 1 in accordance with the compounding compositions shown in Tables 3 and 4.

Test pieces where the various paint compositions of the examples and comparative examples had been used as top-coat paints were produced with the method outlined below, a performance evaluation of the paint films was carried out and the results are summarized in Tables 3 and 4. Moreover, the paint compositions were submitted for painting after being diluted with the mixed solvent in such a way that the viscosity was 120 seconds (Ford Cup No. 4, 25° C.).

Test Piece Preparation

An epoxy resin-based undercoat paint (trade name Precolor Primer HP-301, produced by the BASF Coatings Japan Co. Ltd.) was coated with a bar coater onto an aluminum/zinc alloy plated steel sheet (AL 55%) of thickness 0.35 mm, which had been subjected to a chemical forming treatment, in such a way as to provide a dry film thickness of 5 μm and baked in a hot draught drier for 40 seconds where the highest temperature reached by the sheet was 210° C. and an undercoat paint film was formed. A paint composition of an example or comparative example was coated over the undercoat paint film with a bar coater in such a way as to provide a dry film thickness of 15 μm and baked in a hot draught drier for 40 seconds where the highest temperature reached by the sheet was 220° C., a top-coat paint film was formed and a test piece was obtained.

Paint film performance evaluations as indicated below were carried out with the test pieces obtained and the results are shown in Tables 3 and 4.

Rain Streak Staining Resistance

Test pieces (100 mm×200 mm×0.3 mm) were fitted in such a way that the coated surface was facing north on a standing platform modeling a house frontage at the Totsuka Works of the BASF Coatings Japan Co. Ltd. and exposure tests were carried out and a test piece which had been subjected to a 3 month exposure test and a test piece which had been subjected to a 6 month exposure test were obtained.

The state of the paint film on each test piece was observed visually and evaluated on the basis of the following criteria:
◎: No trace of rain streaks could be seen.
○: Slight traces of rain streaks could be seen.
X: Traces of rain streaks could be seen.

Bending Workability

The test piece was bent through 180° in such a way that sheets similar to the test piece were inserted to produce a bending workability test piece. At this time the number of sheets within the test piece is indicated by 0T, 2T and the like. For examples, 0T indicates that the test piece was bent with no sheet similar to the test piece inserted, and 2T indicates that the test piece was bent in such a way that two sheets similar to the test piece were inserted. In the performance evaluation of this invention 4T tests were carried out and cellophane tape was firmly stuck over the apex part after bending, the tape was peeled away in one go with the end of the tape at an angle of 45° and an assessment was made on the basis of the following criteria depending on the state of peeling of the paint film.
◎: No peeling of the paint film was observed.
○: Slight peeling of the paint film was observed.
X: Peeling of the paint film was observed.

Water Resistance

A 4T bending operation was carried out with a test piece after it had been immersed in boiling water for 2 hours and left to cool for 2 hours at room temperature. Cellophane tape was firmly stuck over the apex part after bending, the tape was peeled away in one go with the end of the tape at an angle of 45° and an assessment was made on the basis of the following criteria depending on the state of peeling of the paint film.
◎: No peeling of the paint film was observed.
○: Slight peeling of the paint film was observed.
X: Peeling of the paint film was observed.

TABLE 3

| Paint Composition | | Example | | | | | | |
|---|---|---|---|---|---|---|---|---|
| | | 1 | 2 | 3 | 4 | 5 | 6 | 7 |
| Pigment | Titanium Dioxide (Note 6) | 34.2 | 35.8 | 35.5 | 35.5 | 34.2 | 35.2 | 29.2 |
| Hydroxyl Group-containing Resin (A) | A1 | 39.9 | 41.8 | 41.4 | 41.4 | 39.9 | 41.4 | 34.1 |
| | A2 | | | | | | | |
| Crosslinking Agent (B) | B-1 (Note 1) | 17.4 | | | | 17.4 | 17.9 | 14.8 |
| | B-2 (Note 2) | | 13.4 | | | | | |
| | B-3 (Note 3) | | | 14.2 | 14.2 | | | |
| Radical Copolymer (C) | C-1 | 5.1 | | | | | 3.5 | 13.1 |
| | C-2 | | 5.4 | | | | | |
| | C-3 | | | 5.3 | | | | |
| | C-4 | | | | 5.3 | | | |
| | C-5 | | | | | 5.1 | | |

TABLE 3-continued

|  |  |  |  |  |  |  |  |
|---|---|---|---|---|---|---|---|
| Organosilica Sol (D) | D-1 (Note 4) | 3.4 | 3.6 | 3.5 | 3.5 | 3.4 | 2.3 | 8.8 |
| Curing Catalyst | Tin-based catalyst (Note 7) |  |  | 0.1 | 0.1 |  |  |  |
| TOTAL |  | 100.0 | 100.0 | 100.0 | 100.0 | 100.0 | 100.0 | 100.0 |
| {(C) + (D)}/{(A) + (B)} (Solid Fraction Mass Ratio) |  | 9% | 9% | 9% | 9% | 9% | 6% | 27% |
| (C)/(D) (Solid Fraction Mass Ratio) |  | 2.0 | 2.0 | 2.0 | 2.0 | 2.0 | 2.0 | 2.0 |
| (A)/(B) (Solid Fraction Mass Ratio) |  | 2.33 | 2.33 | 2.33 | 2.33 | 2.33 | 2.33 | 2.33 |
| Rain Streak Staining Resistance | After 3 month exposure test | ◎ | ◎ | ○ | ○ | ○ | ○ | ◎ |
|  | After 6 month exposure test | ◎ | ◎ | ◎ | ◎ | ◎ | ○ | ◎ |
| Bending Workability (4T) |  | ◎ | ◎ | ◎ | ◎ | ◎ | ◎ | ◎ |
| Water Resistance (4T) |  | ◎ | ◎ | ◎ | ◎ | ◎ | ◎ | ○ |

|  |  | Example |  |  |  |  |  |
|---|---|---|---|---|---|---|---|
| Paint Composition |  | 8 | 9 | 10 | 11 | 12 | 13 |
| Pigment | Titanium Dioxide (Note 6) | 33.8 | 34.3 | 34.0 | 34.3 | 32.3 | 35.8 |
| Hydroxyl Group-containing Resin (A) | A1 | 39.4 | 40.0 | 39.7 | 40.0 | 37.7 |  |
|  | A2 |  |  |  |  |  | 41.8 |
| Crosslinking Agent (B) | B-1 (Note 1) | 17.2 | 17.4 | 17.3 | 17.4 | 16.4 |  |
|  | B-2 (Note 2) |  |  |  |  |  | 13.4 |
|  | B-3 (Note 3) |  |  |  |  |  |  |
| Radical Copolymer (C) | C-1 | 1.8 | 6.2 | 3.8 | 5.8 | 8.1 |  |
|  | C-2 |  |  |  |  |  | 5.4 |
|  | C-3 |  |  |  |  |  |  |
|  | C-4 |  |  |  |  |  |  |
|  | C-5 |  |  |  |  |  |  |
| Organosilica Sol (D) | D-1 (Note 4) | 7.8 | 2.1 | 5.1 | 2.6 | 5.4 | 3.6 |
| Curing Catalyst | Tin-based catalyst (Note 7) |  |  |  |  |  |  |
| TOTAL |  | 100.0 | 100.0 | 100.0 | 100.0 | 100.0 | 100.0 |
| {(C) + (D)}/{(A) + (B)} (Solid Fraction Mass Ratio) |  | 9% | 9% | 9% | 9% | 15% | 9% |
| (C)/(D) (Solid Fraction Mass Ratio) |  | 0.3 | 4.0 | 1.0 | 3.0 | 2.0 | 2.0 |
| (A)/(B) (Solid Fraction Mass Ratio) |  | 2.33 | 2.33 | 2.33 | 2.33 | 2.33 | 2.33 |
| Rain Streak Staining Resistance | After 3 month exposure test | ○ | ◎ | ◎ | ◎ | ◎ | ◎ |
|  | After 6 month exposure test | ◎ | ○ | ◎ | ◎ | ◎ | ◎ |
| Bending Workability (4T) |  | ◎ | ◎ | ◎ | ◎ | ◎ | ◎ |
| Water Resistance (4T) |  | ◎ | ◎ | ◎ | ◎ | ◎ | ◎ |

TABLE 4

|  |  | Comparative Example |  |  |  |  |  |  |
|---|---|---|---|---|---|---|---|---|
| Paint Composition |  | 1 | 2 | 3 | 4 | 5 | 6 | 7 |
| Pigment | Titanium Dioxide (Note 6) | 34.2 | 34.2 | 34.2 | 34.2 | 34.2 | 34.2 | 34.2 |
| Hydroxyl Group-containing Resin (A) | A1 | 39.9 | 39.9 | 39.9 | 39.9 | 39.9 | 39.9 | 39.9 |
| Crosslinking Agent (B) | B-1 (Note 1) | 17.4 | 17.4 | 17.4 | 17.4 | 17.4 | 17.4 | 17.4 |
| Radical Copolymer (C) | C-1 |  |  |  |  |  |  |  |
|  | C-6 | 5.1 |  |  |  |  |  |  |
|  | C-7 |  | 5.1 |  |  |  |  |  |
|  | C-8 |  |  | 5.1 |  |  |  |  |
|  | C-9 |  |  |  | 5.1 |  |  |  |
|  | C-10 |  |  |  |  | 5.1 |  |  |
|  | C-11 |  |  |  |  |  | 5.1 |  |
|  | C-12 |  |  |  |  |  |  | 5.1 |
| Organosilica Sol (D) | D-1 (Note 4) | 3.4 | 3.4 | 3.4 | 3.4 | 3.4 | 3.4 | 3.4 |
|  | D-2 (Note 5) |  |  |  |  |  |  |  |
| TOTAL |  | 100.0 | 100.0 | 100.0 | 100.0 | 100.0 | 100.0 | 100.0 |
| {(C) + (D)}/{(A) + (B)} (Solid Fraction Mass Ratio) |  | 9% | 9% | 9% | 9% | 9% | 9% | 9% |

TABLE 4-continued

| | | | | | | | | |
|---|---|---|---|---|---|---|---|---|
| (C)/(D) (Solid Fraction Mass Ratio) | | 2.0 | 2.0 | 2.0 | 2.0 | 2.0 | 2.0 | 2.0 |
| (A)/(B) (Solid Fraction Mass Ratio) | | 2.33 | 2.33 | 2.33 | 2.33 | 2.33 | 2.33 | 2.33 |
| Rain Streak Staining Resistance | After 3 month exposure test | X | X | X | X | X | X | X |
| | After 6 month exposure test | ○ | ○ | X | ○ | ○ | ○ | ○ |
| Bending Workability (4T) | | ◎ | ◎ | ◎ | ◎ | ◎ | ◎ | ◎ |
| Water Resistance (4T) | | ◎ | ◎ | ◎ | ◎ | ◎ | ◎ | ◎ |

| | | Comparative Example | | | | | | |
|---|---|---|---|---|---|---|---|---|
| Paint Composition | | 8 | 9 | 10 | 11 | 12 | 13 | 14 |
| Pigment | Titanium Dioxide (Note 6) | 34.2 | 37.4 | 27.2 | 33.7 | 34.4 | 35.4 | 36.0 |
| Hydroxyl Group-containing Resin (A) | A1 | 39.9 | 43.6 | 31.7 | 39.3 | 40.1 | 41.3 | 42.0 |
| Crosslinking Agent (B) | B-1 (Note 1) | 17.4 | 19.0 | 13.8 | 17.1 | 17.5 | 18.0 | 18.3 |
| Radical Copolymer (C) | C-1 | 5.1 | | 16.3 | 0.8 | 6.7 | 5.3 | |
| | C-6 | | | | | | | |
| | C-7 | | | | | | | |
| | C-8 | | | | | | | |
| | C-9 | | | | | | | |
| | C-10 | | | | | | | |
| | C-11 | | | | | | | |
| | C-12 | | | | | | | |
| Organosilica Sol (D) | D-1 (Note 4) | | | 10.9 | 9.1 | 1.4 | | 3.6 |
| | D-2 (Note 5) | 3.4 | | | | | | |
| TOTAL | | 100.0 | 100.0 | 100.0 | 100.0 | 100.0 | 100.0 | 100.0 |
| {(C) + (D)}/{(A) + (B)} (Solid Fraction Mass Ratio) | | 9% | 0% | 36% | 9% | 9% | 6% | 3% |
| (C)/(D) (Solid Fraction Mass Ratio) | | 2.0 | — | 2.0 | 0.1 | 6.5 | — | — |
| (A)/(B) (Solid Fraction Mass Ratio) | | 2.33 | 2.33 | 2.33 | 2.33 | 2.33 | 2.33 | 2.33 |
| Rain Streak Staining Resistance | After 3 month exposure test | ◎ | X | ◎ | X | ○ | ○ | X |
| | After 6 month exposure test | ○ | X | ◎ | ○ | X | X | ○ |
| Bending Workability (4T) | | X | ◎ | ◎ | ◎ | ◎ | ◎ | ◎ |
| Water Resistance (4T) | | X | ◎ | X | ◎ | ◎ | ◎ | ◎ |

Details of the various compounded components shown in Tables 3 and 4 are indicated below.

(Note 1) B-1 (Trade name Melan 2040, produced by the Hitachi Kasei Kogyo Co., imino group-containing type butylated melamine resin, resin solid fraction 59 mass %)

(Note 2) B-2 (Trade name Cymel 325, produced by the Cytec Industries Co., imino group-containing type methylated melamine resin, resin solid fraction 80 mass %)

(Note 3) B-3 (Desmodure BL3175, produced by the Sumika Beyer Urethane Co., blocking agent: methyl ethyl ketone oxime, HDI isocyanurate type, solid fraction 75 mass %)

(Note 4) D-1 (Trade name MIBK-SD, produced by the Nissan Kagaku Kogyo Co., average particle diameter from 10 to 15 nm, solid fraction 30 mass %)

(Note 5) D-2 (Trade name MIBK-SD-L, produced by the Nissan Kagaku Kogyo Co., average particle diameter from 40 to 50 nm, solid fraction 30 mass %)

(Note 6) Titanium Dioxide (Trade name Ti-Pure R960, produced by the DuPont Co.)

(Note 7) Tin-based Catalyst (Trade name Neostan U-100, produced by the Nitto Kasei Co., dibutyltin dilaurate)

What is claimed is:

1. A paint composition comprising:
   a hydroxyl group-containing resin (A);
   a crosslinking agent (B), which reacts with hydroxyl groups;
   a radical copolymer (C); and
   an organosilica sol (D);
   wherein the radical copolymer (C) has,
   (a) a monomer composition, with respect to the total mass of radically polymerizable monomer, of from 70.0 to 99.8 mass % unsaturated carboxylic acid amide, from 0.2 to 10 mass % radically polymerizable organosiloxane and from 0 to 29.8 mass % other radically polymerizable monomer,
   (b) a weight average molecular weight from 1,500 to 15,000, and
   (c) a hydroxyl group value of from 10 to 50 mg KOH/g,
   wherein the organosilica sol (D) is of average particle diameter from 1 to 30 nm,
   and wherein the solid fraction mass ratio represented by $$\{(C)\text{component}+(D)\text{component}\}/\{(A)\text{component}+(B)\text{component}\}$$

is from 3 to 30%, and the solid fraction mass ratio represented by $$\{(C)\text{component}/(D)\text{component}\}$$

is from 0.2 to 5.0.

2. The paint composition of claim 1, wherein the hydroxyl group-containing resin (A) has a weight average molecular weight of from 2,000 to 60,000 and a hydroxyl group value of from 10 to 200 mg KOH/g.

3. The paint composition of claim 1, wherein the hydroxyl group-containing resin (A) is a hydroxyl group-containing polyester resin.

4. The paint composition of claim 1, wherein the crosslinking agent (B) is selected from melamine resins and blocked polyisocyanate compounds.

5. The paint composition of claim 1, wherein the solid fraction mass ratio represented by {(A)component/(B)component} is from 1 to 9.

6. A paint film, comprising a substrate coated with the paint composition of claim 1.

* * * * *